(12) United States Patent
Koethe

(10) Patent No.: US 6,440,317 B1
(45) Date of Patent: Aug. 27, 2002

(54) CYCLONIC ICE SEPARATION FOR LOW TEMPERATURE JET FUELS

(75) Inventor: Terence Lee Koethe, Keller, TX (US)

(73) Assignee: Fuel Dynamics, Arlington, TX (US)

( * ) Notice: Subject to any disclaimer, the term of this patent is extended or adjusted under 35 U.S.C. 154(b) by 0 days.

(21) Appl. No.: 09/492,608

(22) Filed: Jan. 27, 2000

Related U.S. Application Data

(63) Continuation-in-part of application No. PCT/US98/25678, filed on Dec. 3, 1998, and a continuation-in-part of application No. 08/860,157, filed as application No. PCT/US97/04091 on Mar. 17, 1997, now Pat. No. 6,024,074, which is a continuation-in-part of application No. 08/708,638, filed on Sep. 5, 1996, now abandoned.
(60) Provisional application No. 60/013,636, filed on Mar. 18, 1996, provisional application No. 60/067,745, filed on Dec. 5, 1997, and provisional application No. 60/117,547, filed on Jan. 28, 1999.

(51) Int. Cl.⁷ .................. B01P 21/26; B01D 35/18; C02F 1/18

(52) U.S. Cl. .................. 210/774; 210/787; 210/788; 244/135 R; 141/82; 137/339; 123/541

(58) Field of Search .................. 210/175, 512.1, 210/774, 788, 787; 244/135 R; 141/82; 137/339; 123/541

(56) References Cited

U.S. PATENT DOCUMENTS

| 5,578,209 A | 11/1996 | Weiss .................. 210/512.1 |
| 5,643,470 A | 7/1997 | Amini .................. 210/787 |
| 6,024,074 A | * 2/2000 | Koethe .................. 123/541 |

FOREIGN PATENT DOCUMENTS

| WO | WO 97/36782 | 10/1997 |
| WO | 00/47305 | * 8/2000 |

* cited by examiner

Primary Examiner—David A. Reifsnyder
(74) Attorney, Agent, or Firm—Mark W. Handley; Chauza & Handley, L.L.P.

(57) ABSTRACT

A cyclonic ice separator (72) is provided for removing ice from low temperature aviation fuels. The temperature of the fuel is lowered beneath the freezing point of water, such that significant amounts of dissolved water leaves solution and becomes free water, and the free water freezes and becomes filterable. The fuel is then passed through the cyclonic separator (72), which spins the fuel in an intense cyclonic spiral path 121 to create centrifugal forces which separate the ice from the fuel. Heating elements (110, 128) are provided within the cyclonic separator (72) to prevent blockage of ice and water discharge ports (118, 78). A mixture of fuel, ice and water is passed from the cyclonic separator (72) and into a reclamation unit (80), in which gravity separates a reclaimed portion of the fuel from the ice and water. The fuel is then passed through conventional aircraft filtration equipment (130).

11 Claims, 7 Drawing Sheets

US 6,440,317 B1

CYCLONIC ICE SEPARATION FOR LOW TEMPERATURE JET FUELS

CROSS REFERENCE TO RELATED APPLICATIONS

The present application claims the Benefit of U.S. Provisional Patent Application Serial No. 60/117,547, entailed "CYCLONIC ICE SEPARATION OF LOW TEMPERATURE JET FUELS," filed Jan. 28, 1999. The present application is also a Continuation-in-part of PCT International Patent Application No. PCT/US98/25678, filed Dec. 3, 1998 and entitled "INERT LOADING JET FUEL," which claims the Benefit of U.S. Provisional Patent Application Serial No. 60/067,745, filed on Dec. 5, 1997 and entitled "INERT LOADING JET FUEL". The present application is also a Continuation-in-part of U.S. Application Ser. No. 08/860,157, filed on Jun. 17, 1997, now U.S. Pat. No. 6,024,074, which is a National Phase Application of PCT International Application Serial No. PCT/US97/04091, filed on Mar. 17, 1997, which is a Continuation-in-part of U.S. Application Ser. No. 08/708,638, filed on Sep. 5, 1996, now abandoned, which claims the Benefit of U.S. Provisional Patent Application Serial No. 60/013,636, filed on Mar. 18, 1996, which are entitled "REFRIGERATED FUEL FOR ENGINES".

TECHNICAL FIELD OF THE INVENTION

The present invention relates to treating fuel for use in aircraft and other vehicles, processor and more particularly to an apparatus and process for removing ice from refrigerated jet fuel.

BACKGROUND OF THE INVENTION

Conventional fuel tanks for aircraft have ullages which contain explosive mixtures of atmospheric air and fuel vapors during various stages of operation of the aircraft. Conventional jet fuels include Jet- A, Jet A-1, Jet-B, JP-4, JP-5, JP-7, JP-8 and JP-8-100, as well as others, are loaded into aircraft fuel tanks. The fuel tanks of aircraft are vented to atmosphere to relieve ascent and descent pressure changes, allowing the atmospheric air to enter into the ullages and mix with the fuel vapors above the liquid levels of the volatile fuels contained within the fuel tanks. These explosive mixtures are highly flammable and are easily ignited by a spark or other ignition source, which can result in massive explosions and loss of life to those onboard the aircraft.

Previous attempts have been made to reduce the risks of explosion within the non-vented ullages of aircraft fuel tanks. One such attempt fills the ullages with an inert gas, such as nitrogen ($N_2$), to blanket the liquid fuel and prevent air from entering the ullages so that the fuel vapors in the ullages will not have a readily available oxygen source. The inert gases were provided by on-board tanks or generating systems which proved inefficient and ultimately impractical due to the size of large, heavy tanks used for on-board storage or generating of the inerting gases, and the heavy logistics support required for such systems. This type of system also required alteration of existing aircraft to accommodate such equipment.

Another problem which exists is that the range of aircraft, or the distance which the aircraft can fly, is limited due to the limited volumetric storage capacity of onboard fuel tanks. While in-flight refueling is possible today with some types of aircraft, most refueling is performed on the ground. Such refueling stops prolong travel time and ruin the economics of operating an aircraft. It is therefore desirable to increase the amount of fuel that can be stored on the aircraft, preferably with no or only minimal alteration to the aircraft structure. On such method is that set forth in PCT International Patent Application Ser. No. PCT/US97/04091, filed on Mar. 17, 1997, entitled "REFRIGERATED FUEL FOR ENGINES," invented by Terence Lee Koethe, published on Oct. 9, 1997 and claiming a priority date of Mar. 18, 1996, as set forth above in the section entitled "Cross Reference To Related Applications," and to which the present application claims priority as a Continuation-in-Part.

Reduced temperature fuels will also result in vapor pressures of the fuel vapors within the ullages of fuel tanks which are much lower than the vapor pressures provided by fuels of higher temperatures. Reducing the vapor pressures of fuel vapors within the ullages results in significantly reducing the explosive nature of the vapors in the ullages. The cooling of fuels to temperatures below ambient temperatures, and in particular, below the freezing point of water, thus functions as a vapor phase inhibitor in such ullages. Aircraft may be fueled with fuels which are specifically processed to such lowered temperatures, which will enhance both the safety and the performance of such aircraft.

Water has been a troublesome contaminant of airport jet fuel supplies. Water is found in fuel either in the form of dissolved water or free water. Dissolved water is provided by water molecules that are in solution with the fuel. Free water in fuels is typically in the form of either bulk quantities, such as a water slug, or as entrained water. Entrained water is typically in the form of very small droplets of water suspended in the fuel. Free water which is carried into the aircraft fuel system can cause operational difficulties. Small amounts of entrained water can be tolerated in turbine aircraft engines, typically amounts of less than 30 ppm. However, there is little margin for error and as a result flight performance is often limited in terms of both altitude and minimum allowed fuel temperature. Also, when low temperatures are encountered, such as the temperatures found at high altitudes, the free water in fuels may freeze, forming ice. Most aircraft are equipped with fuel warming devices which counteract the formation of ice to prevent possible flow constrictions caused by such ice in fuel.

Since water is heavier than fuel, the water settles out over time and water slugs are usually found at the bottom of large storage tanks. Floating siphons in storage tanks remove fuel from the upper regions of the storage tanks to assure that the water is not transferred to the aircraft as a water slug. However, some entrained water will still be removed from storage tanks by the floating siphons and pass into fuel flow lines. Entrained water may often be removed from the fuel flow lines by coalescing filters. Dissolved water molecules cannot be removed from fuels by filtration. However, with a reduction in the temperature of the fuel, dissolved water molecules are removed from solution within the fuel and become free water. Generally water comes out of solution at a rate of 1 ppm/–° F. Additionally, as the temperature of the fuel is lowered below that of the freezing point of water, entrained water in the fuel will change phase from a liquid to a solid. At higher altitudes where lower temperatures are encountered, dissolved water may leave from solution with the fuel and become free water that will freeze and form ice particles within the fuel, which may impede fuel flow. At sub-freezing temperatures, entrained water molecules aboard aircraft in both free and dissolved form cause greater fuel viscosity, therefore, it is desirous to create jet fuel which is substantially free of dissolved water and entrained water.

Jet fuel is typically delivered to aircraft at temperatures above the freezing point of water, even during cold winter weather operations. The fuel is passed through conventional filtration equipment, which typically includes three stages of filtration that remove particulate matter and free water from the fuel. Particulate contamination is filtered out and liquid water is coalesced in a first stage of the conventional filtration equipment. In the second stage, free water is entrapped. The third stage typically includes monitoring devices to assure the fuel is of a desired quality. The monitors in the third stage will shut down the entire fuel loading process should the fuel quality not meet the desired quality standards. If fuel is loaded onboard aircraft at temperatures below the freezing point of water, ice will be formed by the free water and some of the dissolved water, which leaves solution with the fuel after cooling and becomes free water. This ice may be removed by the standard filtration equipment. Low temperature jet fuel operations, such as for extending the range of aircraft and for reducing the explosive nature of the ullages of aircraft, may cause excessive ice production from the free water and the water initially dissolved in aircraft fuels, such that the capacity of conventional filtration equipment will be exceeded and automatic failsafe system shutdowns will occur.

SUMMARY OF THE INVENTION

In one aspect of the present invention, a method and apparatus are provided for removing ice from low temperature aviation fuels. The temperature of the fuel is lowered beneath the freezing point of water, such that significant amounts of dissolved water leaves solution and becomes free water, and then the free water freezes and becomes filterable from the fuel. The fuel is then passed through a cyclonic separator, which spins a fuel in an intense cyclonic spiral, and centrifugal force separates the ice from the fuel. Heating elements are provided within the cyclonic separator to prevent blockage of ice and water discharge ports. A mixture of fuel, ice and water is passed from the cyclonic separator and into a reclamation unit, in which gravity separates a reclaimed portion of the fuel from the ice and water. The fuel is then passed through conventional aircraft fuel filtration equipment.

In another aspect of the present invention, a method and apparatus are disclosed for providing inert loading jet fuel for use in cold fuel, hot fuel or conventional temperature fuel applications for aircraft. Inert loading jet fuel is preferably provided by direct contact injection, in which an inerting material, such as, for example, nitrogen ("$N_2$"), is directly injected into the jet fuel as the fuel is being loaded aboard the aircraft. The inerting material is preferably injected directly into the jet fuel by injection nozzles which are in direct contact with a flow of the jet fuel. The inert material is metered to accommodate an entrained level of the inerting material which will outgas as an inert gas into a ullage of an onboard, vented fuel tank of the aircraft, rendering the mixture of gases in the ullage nonexplosive for a period of time. The inerting material can be injected into fuels which are used to provide cold temperature fuels, which are cooled to temperatures that are less than ambient temperatures so that the unit volume of the fuel per pound of fuel is reduced. The fuel is preferably cooled externally to the aircraft at a ground location, and then stored in onboard fuel tanks at the reduced temperatures, allowing more fuel to be held in the storage tanks and increasing the energy value of the fuel per unit volume over fuel at ambient temperatures. A heat transfer surface may also cooled below ambient temperature using the cold fuel or the inerting material, and then ambient air is passed over the heat transfer surface and cooled for passing into the passenger compartment of the aircraft.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
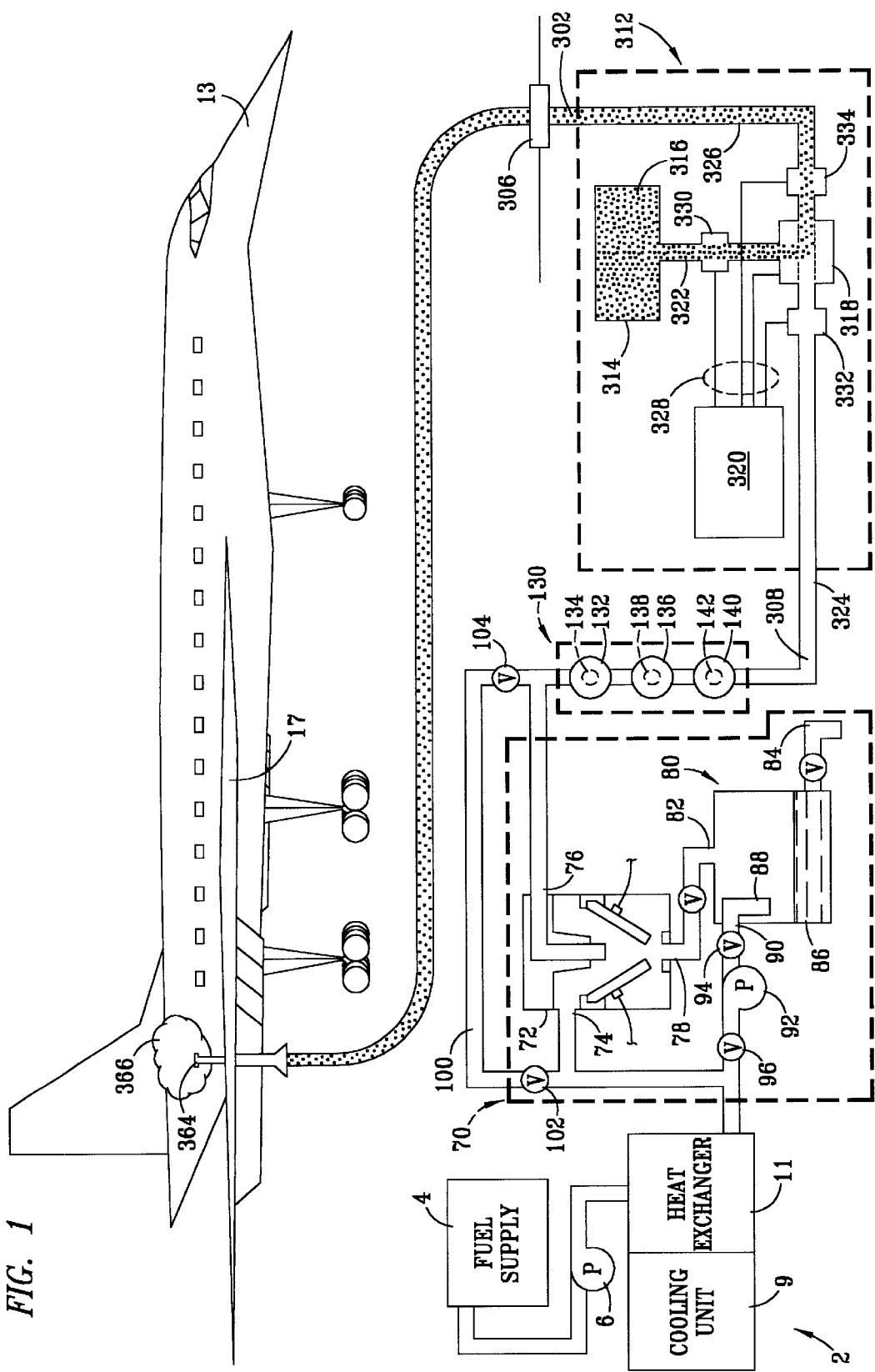
FIG. 1 is a schematic diagram of a fixed, ground based, aircraft refueling station having a cyclonic separator, a filtration system and an inert material injection unit.

FIG. 1 depicts a fuel supply system 2 for fueling an aircraft 13 according to the present invention. The fuel supply system 2 includes a fuel supply 4, which preferably provides fuel of the type specified by American Petroleum Institute ("API") standards to be: Jet A, Jet B, Jet B-1; or preferably U.S. Military ("Mil") specifications to be: JP-1, JP-2, JP-3, JP-4, JP-5, JP-6, JP-7, JP-8. The fuel from the fuel supply 4 is preferably inerted to provide an inert aviation fuel 302 as part of a ground based hydrant system which includes fuel hydrant 306, located in a fuel containment pit. In other embodiments, a portion or all of the system 2 may be truck, trailer or skid mounted. The fuel supply system 2 includes a fuel supply 4 which is connected to the inlet of a pump 6. The discharge of the pump 6 is connected to a thermal processing unit, which includes a cooling unit 9 and a heat exchanger 11. Fuel from the fuel supply 4 is passed through the heat exchanger 11 and cooled to temperatures, which are preferably below 32° F., and also to those temperatures as set forth below in the following discussion, such as for extending the range of aircraft. The fuel is preferably cooled to such lower temperatures that significant portions of dissolved water is removed from solution, and becomes free water which freezes at the lower temperatures. Cooling unit 9 and heat exchanger II may be provided by the equipment described below.

The fuel discharged from the heat exchanger 11 passes into an ice removal unit 70. The ice removal unit 70 includes a cyclonic separator 72. The cyclonic separator 72 includes a fuel inlet 74, a fuel outlet 76 and an ice discharge 78. The ice discharge 78 is connected to a fuel reclamation unit 80. The fuel reclamation unit 80 has an inlet 82 and a waste discharge 84. The reclamation unit 80 includes a tank housing 86 within which fuels will gravity separate from the ice and the water which thaws from the ice, by virtue of the fuels having a density which is less than the ice and the water. A fuel inlet 88 is connected to a discharge 90 of the reclamation unit 80. A pump 92 is provided for pumping the fuel from within the tank housing 86, pulling the fuel through the inlet 88 and into the suction of the pump 92. Valves 94 and 96 are provided for selectively shutting off the flow of reclaimed fuel from the reclamation unit 80. The reclaimed fuel is then passed back into the inlet 74 of the cyclonic separator 72.

Also provided is a bypass line 100. The bypass line 100 has a valve 102 at the inlet of the bypass 100 which is connected to the inlet 74 of the cyclonic separator 72. A discharge end of the bypass 100 includes a valve 104 and is connected to the fuel discharge 76 of the cyclonic separator 72. Additionally, the ice removal unit 70 may include two or more of cyclonic separators 72 which are connected in parallel, so that one of the cyclonic separators 72 may be operated if the other of the cyclonic separators 72 require periodic heating to remove ice blockages, should such blockages occur.

A conventional aviation fuel stage one, two and three filtration unit 130 is provided for filtering the fuel after removal of the ice therefrom. In a first stage, a conventional stage one aircraft fuel coalescing filter 132 is provided. The stage one filter/coalescer cartridge 132 is a particulate filter and a free water coalescer that makes free water droplets larger. A cartridge 134 is within the filter stage one filter 132. A stage two filter 136 is provided with a cartridge element 138, which filters the remaining coalesced free water out of the fuel flow. Dissolved water passes through the filter element 138. A stage three positive displacement filter 140 includes an electronic monitor (not shown) which detects the presence of free water, and shuts the system down if a level of free water is detected which is above a desired set point. The stage three filter 140 also includes a filter cartridge 142. The stage three fuel quality monitor maintains a constant vigil on the entire system, and alerts the operator with an alarm and initiates a failsafe shutdown should quantities of free water above desired set point be detected in the processed fuel flow. The stage three filter cartridge element 142 finely filters free water from the fuel flow and quickly builds up pressure that shuts down the entire system 2 when small quantities of free water are encountered. Dissolved water will pass through the stage three filter cartridge element 142.

Figure 2:
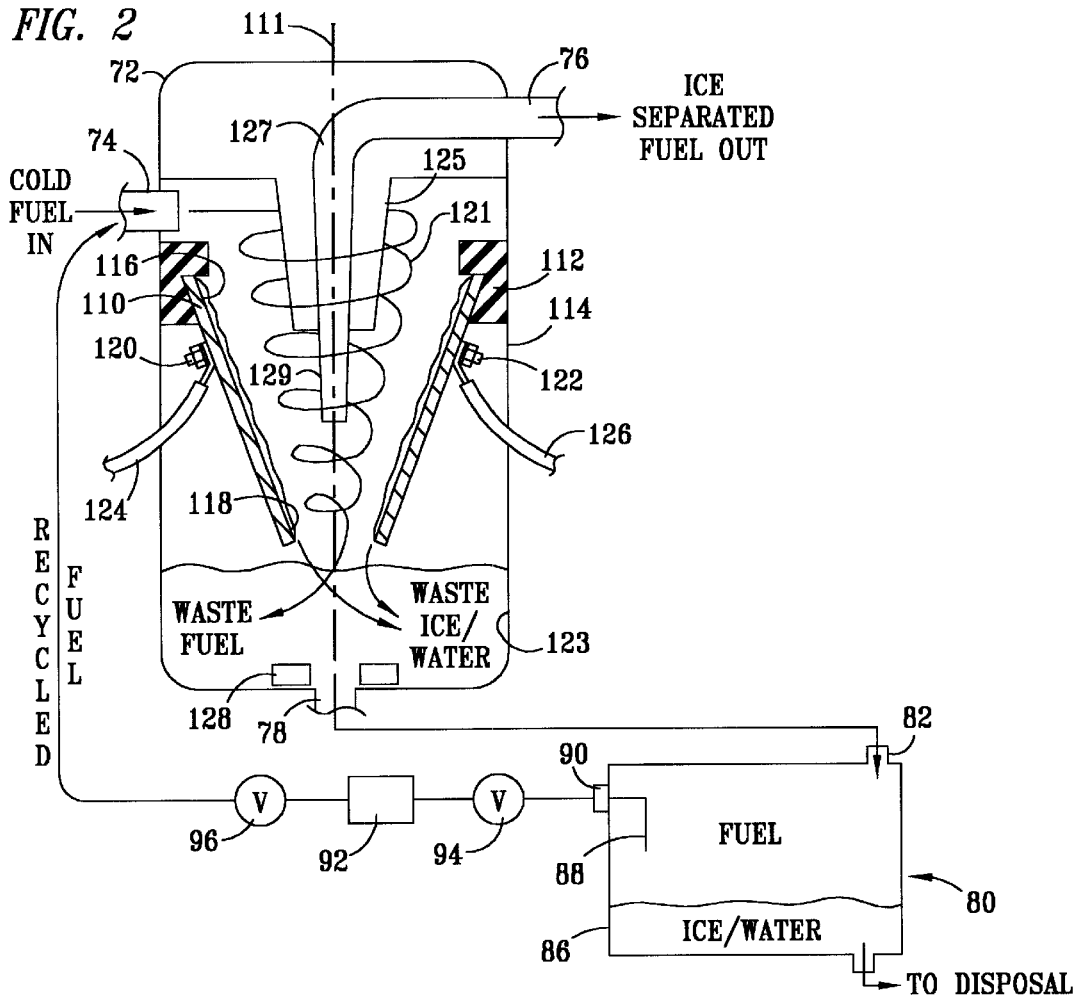
FIG. 2 is a sectional, elevation view of the cyclonic separator and a reclamation unit.

FIG. 2 is a schematic diagram depicting a sectional elevation view of the ice removal unit 70, which includes the cyclonic separator 72. The cyclonic separator 72 includes a conical member 110, which preferably is formed of stainless steel or aluminum and has a downwardly narrowing, frusto-conical shape that symmetrically extends around a centrally disposed, longitudinal axis 111. The conical member 110 is disposed within a housing 114 of the cyclonic separator 72. An electrical insulator 112 provides a hanger unit which is disposed between the conical member 110 and the housing 114. A larger end 116 of the conical member 110 is disposed in a upwardly disposed position above a tapered, smaller cross-sectional lower opening 118. Two electrodes 120 and 122 are provided on opposite sides of the conical member 110 for passing electrical current to electrically heat the conical member 110. Electrical leads 124 and 126 are connected to respective ones of the electrodes 120 and 122. This provides a surface temperature of the conical member 110 of preferably 34° F., such that any ice contacting the interior surface of the conical member 110 will melt rather than adhering thereto, to prevent the lower opening 118 from being obstructed. Preferably, an AC current is applied to the electrodes 120 and 122 of such a frequency and current such that impedance heating warms the conical member 110. In other embodiments, resistive or inductive heating elements may be secured to the conical member 110 to heat the surface thereof to prevent ice form adhering thereto.

Fuel passing from the inlet 74 into the interior of the conical member 110 travels in a spiral path 121 which tapers, or narrows, as it extends downwardly towards the lower portion of the conical member 110. Heavier ice partials and water molecules will move to the outer most circumference within the cross sectional area of the conical member 110, and then gravity feed down through the lower opening 118. The inward conically shaped member 125 is shaped such that it will match the interior peripheral surface of the conical member 110, causing the entering fuel to spin in the spiral path 121. The lighter fuel molecules will follow the path 121 in more of an interiorly disposed path, more towards the center-line axis 111 of the conical section 110. The inlet 129 is provided such that substantially only the fuel, and not ice or water, will be drawn within the inlet 129 and pass through the flow line 127 to the discharge outlet 76 of the cyclonic separator 72.

A lower region 123 of the housing 114 provides a sump which will collect the ice and water, which are heavier than the fuel. Gravity will cause it to collect in the bottom section 123. Located in the bottom section 123 is an annular shaped heating element 128 which extends circumferentially around the outlet 78 of the housing 114 of the cyclonic separator 72. The heating element 128 provides a low temperature heating element to prevent ice from obstructing the flow through the outlet 78.

The inlet 82 of the reclamation unit 82 is connected to the discharge of the cyclonic separator 72. The tank housing 86 of the reclamation unit 82 is sized such that ice and water will settle to the bottom of the tank and the lighter fuel will float to the top. The inlet 88 is used for withdrawing the fuel from the interior of the reclamation unit 80 passing the reclaimed fuel back into the inlet 74 of the cyclonic separator 72.

In operation, fuel will pass into the inlet 74 of the cyclonic separator 72, and then along the path 121 from the upper opening 116 of the conical member 110. Centrifugal force will cause the heavier ice and water to move to the exterior outer peripheral portion of the interior of the conical member 110, and against the interior periphery of the conical member 110. A minimum inlet pressure of 15.0 pounds per square inch is preferably provided by the pump 6, to assure operation of the cyclonic separator 72. The lighter fuel will pass within the central regions of the interior of the conical member 110 and into the inlet 129 of the flow line 127. The flow line 127 passes the fuel to the fuel outlet 76 of the cyclonic separator 72. The ice and free water which collect along the interior periphery of the conical member 110 are preferably heated by impedance heating of the metal from which the conical member 110 is made. AC current of a frequency sufficient for warming the body of the conical member 110 such that the ice will not obstruct the opening 118 of the conical member 110 is applied to the electrodes 120 and 122, and then to opposite lateral sides of the conical member 110. Similarly, the annular shaped heating member 128 is warmed to prevent obstruction of the discharge opening 78 in the lower region 123 of the housing 114 of the cyclonic separator 72.

A mixture of water and ice and a small portion of fuel then passes through the outlet 78 of the cyclonic separator 72 and into the inlet 82 of the reclamation unit 80. Gravity will then cause the ice and water to go to the bottom and be removed through the discharge 84. The lighter weight fuel will then pass into the inlet 88 and the pump 92 will cause it to flow back into the inlet 74 of the cyclonic separator 72.

Figure 3:
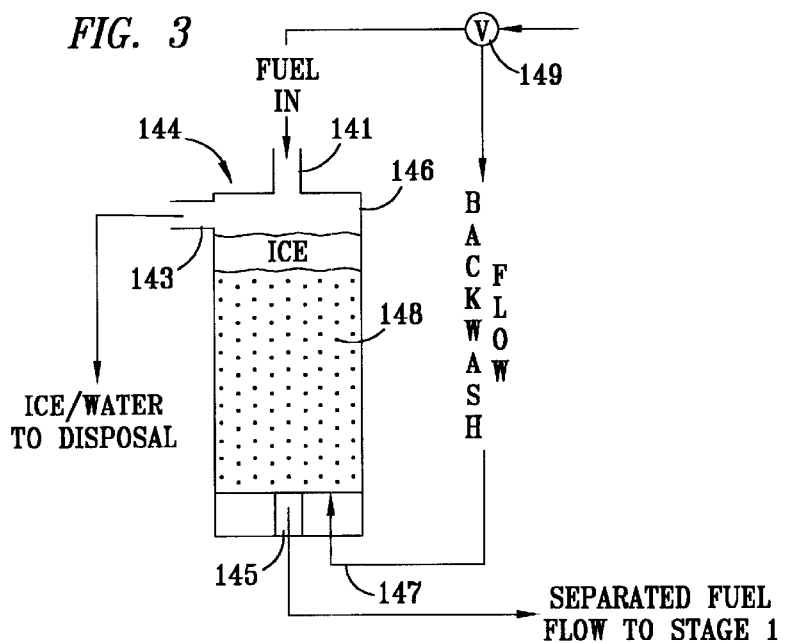
FIG. 3 is a sectional view of an alterative ice separation unit to the cyclonic separator.

FIG. 3 shows an alternative ice separator unit 144 to the cyclonic filter 72. The separator unit 144 has a housing 146 with an inlet 141, an ice and water outlet 143, and a separated fuel flow outlet 145. The housing also has a back-flow port 147 which is connected to a back flow valve 149, such that a filter media 148 disposed within the housing 146 can be cleaned. Preferably, the filter media 148 is provided by glass beads which filter ice out of the fuel flow, prior to the fuel flow being routed through the conventional filtration system 130 (shown in FIG. 1). The back-flow valve 149 is operated periodically to reverse the flow through the housing 146 to removed ice from within the housing. Two of the separator units 144 may be connected in parallel and alternatively operated to remove ice from the fuel flow as the other is being backflowed to removed the ice therefrom, thus allow the two separator units 144 to maintain a constant fuel flow to the aircraft. In other embodiments, teflon coated filter elements may be used for the filter element 148 in place of the glass beads.

Referring again to FIG. 1, the inert loading jet fuel system 2 includes an inerting unit 312 which is preferably connect to the ice removal unit 70 and the filtration unit 130, downstream of the units 70 and 130 for receiving deiced and filtered fuel 308. The inerting unit 312 is operated to inject an inerting agent into the fuel stream to provide inert aviation fuel 302. The inerting unit 312 is preferably a ground based hydrant system, as shown, but in other embodiments a portion or all of the inerting system 312 may be truck, trailer or skid mounted. The inerting unit 312 includes a container 314 of inerting agent 316, which is supplied by an inerting material which will later outgas from the fuel to displace any ambient air located in the ullage of the fuel storage 17 aboard the aircraft 13. The inerting agent 316 is preferably nitrogen, in either liquid or gaseous form. Other inert materials may be used as an inerting agent, such as materials which will be carried but not go into solution with the fuel and outgas into the ullage of onboard fuel storage tanks as an inert gas over a period of time. The inerting unit 312 further includes a mixing unit 318 and a control unit 320. The mixing unit 318 is connected to the container 314 by the flow line 322. The mixing unit 318 is also connected to the 324, which is connected to the ice removal unit 70 and the filtration unit 130. A flow line 326 connects a discharge of the mixing unit 318 to the hydrant 306. The control unit 320 is preferably a data processing system, which is connected to the mixing unit 318 by data and control signal lines 328. The signal lines 328 also connect to sensor units 330, 332 and 334, which detect the flow rate, temperature, and specific gravity parameters of the flow passing through the flow lines 322, 324 and 326.

Figure 4:
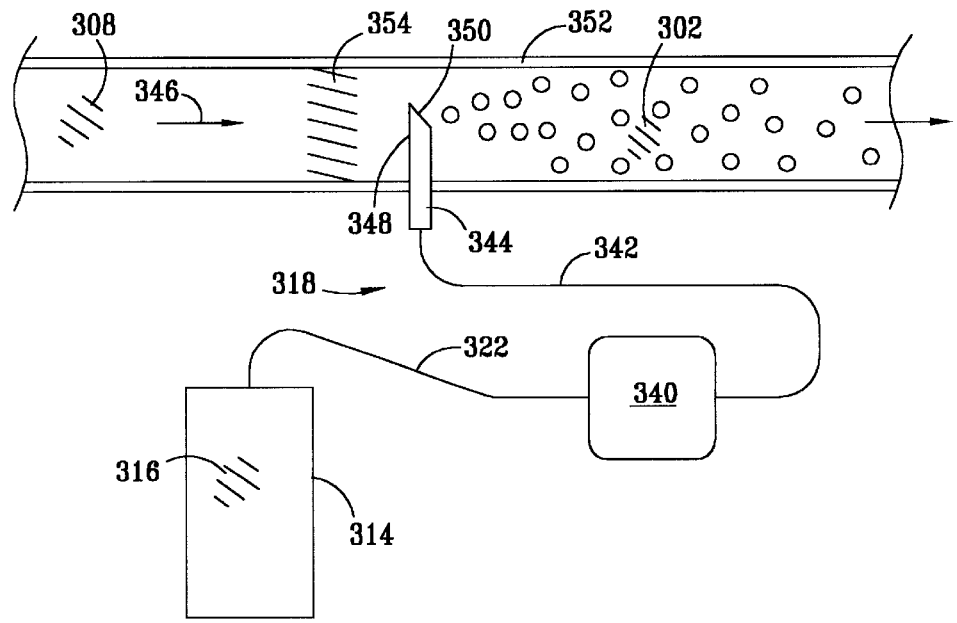
FIG. 4 is a schematic diagram of an injector for injecting an inerting material into a central portion of a flow of fuel.

FIG. 4 is a schematic diagram of the container 314 of the inerting agent 316 and the mixing unit 318. The mixing unit 318 has a flow control valve 340, which is preferably controlled by the control unit 320 (shown in FIG. 1). The valve 340 controls the flow of inerting agent through the flow lines 322 and 342, and through an injector 344 into a flow 346 of the fuel 308. One or more of the injectors 344 are provided, preferably by an injection tube 348 having an outlet 350 which extends into a central portion of a mixing section of fuel flow line 352. A plurality of agitator baffles 354 are disposed in a mixing section of the flow line 352, preferably upstream of the injector outlet 350, to enhance mixing of the inerting agent 316 into the fuel 308. The injection outlet 350 preferably faces at a forty-five degree angle to the direction of the flow 346.

Figure 5:
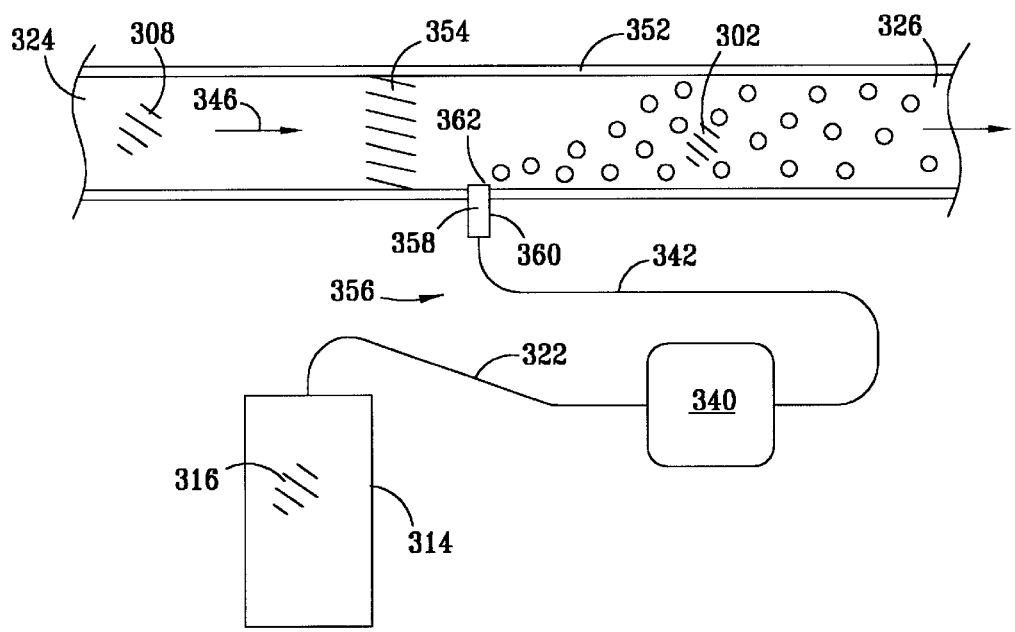
FIG. 5 is a schematic diagram of an injector for injecting an inerting material into the side of a flow of fuel.

FIG. 5 is a schematic diagram of the container 314 of the inerting agent 316 and an alternative mixing unit 356. Similar to the mixing unit 316, the mixing unit has the flow control valve 340, which is preferably controlled by the control unit 320 (shown in FIG. 1), and which controls flow of the inerting agent through the flow lines 322 and 342 to an injector 358. One or more of the injectors 358 are provided, preferably with a tubular body 360, which provides a flow passage therethrough, and an outlet 362. The outlet 362 is preferably substantially flush with the side of the mixing section of the flow line 352, and faces perpendicular to the direction of the flow 346 for less flow restriction. The agitator 354 is preferably located upstream from the injector 358. In yet other embodiments, a manifold may be provided by a porous material in one or more injection tubes, such as the tubes 344 and 346, to disperse the inerting agent 316 evenly throughout the fuel 302.

In operation, fuel discharged from the ice removal unit 70 and the filter unit 130 is passed through the mixer 318 and the inerting agent 316 is injected into the fuel flow 346 to provide inert loading jet fuel 302. The inerting agent 316 is preferably nitrogen ($N_2$), such that the inert loading fuel 302 is fuel 308 which has been nitrogenated. The nitrogenated fuel then passes through the hydrant 306 and into the fuel storage 17 aboard the aircraft 13. The inerting agent 314 is suspended within the fuel flow 346 and outgases into the ullage of the fuel storage 17 in less than ten minutes, and then vents as gas 366 through fuel storage vents 364 over a period of three hours or more. Directly an inerting agent 316, such as nitrogen ($N_2$) into the fuel 308 will temporarily energize the fuel 308 with the inerting agent 316 to provide inert loading fuel 302. Since the fuel 302 is under pumping pressure while being loaded on the aircraft 13, it will suspend the inerting agent 316 therein, and carry the inerting agent 316 into the fuel tank 17, in which the entrained inerting agent 316 gas will release into the ullage thereof. The inerting agent 314 does not contain oxygen and fills the ullage of the aircraft fuel tank 17, and will displace oxygen, such that the mixture of the fuel vapor and the inerting agent 314 within the ullage of tank 17 will be non-combustible. The outgassing condition will safely vent as gas 366 through existing fuel tank venting 364 and provide an explosion-safe condition for up to three hours. Aircraft are at most risk during refueling, taxi, takeoff and climb out, which is typically within this three hour time period.

In other embodiments, the inerting agent 314 may be injected directly into the fuel prior to loading operations, and then the fuel 302 may be maintained under pressure until loading, such that the inerting agent 314 will not substantially outgas from within the fuel 302 while being storage in a ground based tank prior to being loaded onto the aircraft 13. This inerting process may also be used in combination with other processes or equipment for refrigerating fuel for aircraft to extend the range of aircraft, and in combination with processes and equipment for providing hot fuels for aircraft to de-ice aircraft. Additionally, the inerting material may be added by a thermally neutral process, such that the temperature of the fuel is either not substantially changed by the inerting process, or later processing returns the temperature of the fuel to temperatures which are substantially equivalent to the initial temperatures of the fuel prior to processing to add the inerting material. The cold fuel provides additional safety against the buildup of explosive vapors during the cruise legs of flights since the cold fuel emits fewer vapors into the ullages at the lower temperatures, which reduces the vapor pressure of the fuel vapors in the ullage. The nitrogen (N2) is injected into the fuel in a gaseous form. When liquified nitrogen is used as an inerting material, it is first expanded to gaseous form prior to injection into the fuel to prevent freezing of the fuel. Inerting units 312 may be installed on existing aircraft refueling trucks. Fuel tank ullages may be purged with inert material 316 being loaded into the aircraft fuel storage 17 through the fuel hose an into an aircraft fuel loading port, even if no fuel is loaded aboard the aircraft.

A significant reduction in the volume of liquid fuels can be obtained by drastically reducing the temperature of the fuel below ambient temperatures. This has particular application in the field of aviation where fuel storage space is limited. By reducing the volume of the fuel prior to fueling, a greater mass of fuel can be stored for use on the aircraft. This increases the flight time of the aircraft, allowing it greater flight endurance.

The change in volume of kerosene or jet fuel can be approximated for every degree change in temperate by the following formula:

$$V_f = V_i - [V_i(0.0006/° F.)(T_i - T_f)]$$

where $V_f$ is the final volume, $V_i$ is the initial volume, $T_i$ is the initial temperature, and $T_f$ is the final temperature. Thus, one thousand gallons of jet fuel at 60° F. that is cooled to −15° F. will have a final volume of about 955 gal. This becomes especially significant on commercial aircraft where large amounts of fuel are stored and consumed. For instance, a typical "BOEING 747" may hold about 53,000 gallons of fuel. By reducing the temperature of the same volume of fuel from 60° F. to −40° F., a 100° F. temperature differential, this volume is reduced by about 3,180 gallons. This equates to over 20,000 pounds of fuel that can be added to the aircraft's fuel tanks. In other applications, cooling the temperature of the fuel beneath ambient temperatures by a temperature differential of 40° F. may be adequate to provide enhanced fuel capacity and to increase the energy level per unit volume of the fuel, such as cooling the fuel from ambient temperatures of 60° F. to a reduced temperature of 20° F. Additionally, in still other applications, it may be desirable to reduce the temperature of the fuel beneath ambient temperatures, yet maintain the fuel temperatures above 32° F. such that the freezing point of moisture in the ambient air will avoided. Another benefit is that at fuel temperatures of 40° F., the vapor pressure of the fuel in the ullage will be reduced, such that the mixture of fuel and oxygen in the ullage should remain non-combustible at the altitudes at which turbine aircraft fly.

Figure 6:
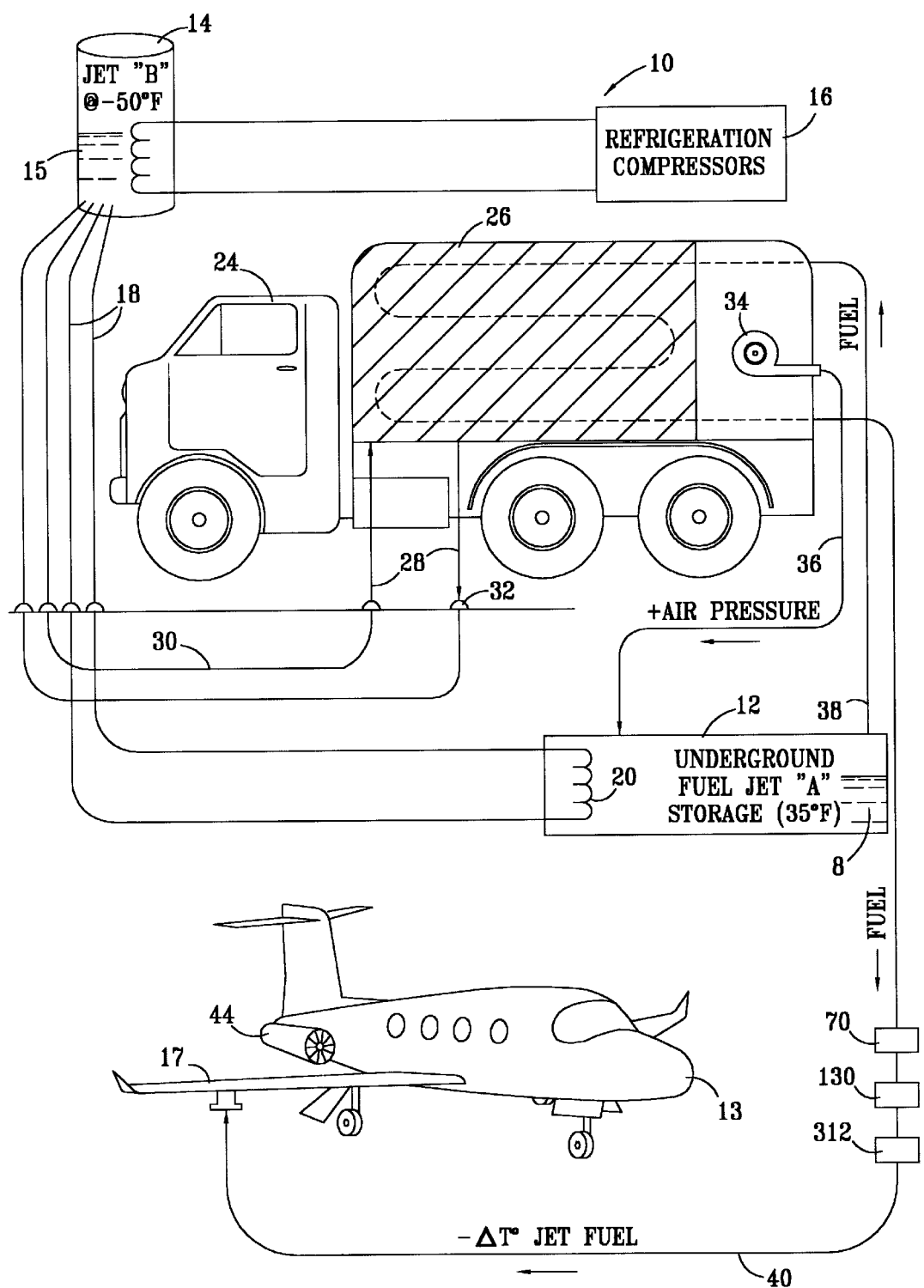
FIG. 6 is a schematic representation of an aircraft being fueled.

Referring to FIG. 6, a fuel cooling system 10 is depicted for refrigeration of jet fuel 8 at a conventional airport facility. Typically, fuel is stored in underground tanks. In this particular case, Jet "A" grade fuel 8 is stored in an underground tank 12. Jet "A" fuel 8 is a warm-weather jet fuel that ceases to flow readily at temperatures below approximately −48° F. This is commonly referred to as the "pour point." Located at a nearby above-ground position is an insulated fuel storage tank 14. The tank 14 holds Jet "B" grade fuel 15. Jet "B" fuel 15 is a cold-weather fuel having a pour point of −58° F. Fuel stored in the tank 14 is coupled to a refrigeration unit 16 that cools that the Jet "B" fuel within the insulated tank 14 to a temperature of about −50° F., which is above the pour point of the fuel. Insulated fuel lines 18 are coupled between the tank 14 and a heat exchange unit 20 which is located in an underground tank 12. By circulating the refrigerated Jet "B" fuel through the heat exchanger 20, the fuel stored in the tank 12 can be prechilled. The temperature of the fuel within the tank 12 should be monitored and the amount of cooling fuel circulated from the tank 14 should be controlled to prevent the temperature of the fuel within the tank 12 from dropping below 32° F. This is to prevent freezing of any existing water that might otherwise damage the tank or fittings. Preferably, the temperature of the fuel within the tank 12 is kept at 35° F.

When it is necessary to fuel an aircraft, such as aircraft 22, a mobile hydrant unit or a truck 24 carrying a heat exchanger 26 is positioned near the aircraft 22 and the underground tank 12, just as a conventional hydrant truck would be during fueling. Although various types of heat exchangers may be used for the heat exchanger 26, a plate-type heat exchanger has been found to be effective. The heat exchanger 26 is connected via hoses 28 to insulated underground pipelines 30 at connections 32. The pipelines 30 feed and return the Jet "B" fuel from the tank 14 as it is circulated through the heat exchanger 26, where it acts as a coolant. As this is done, pressurized air from a compressor 34 is introduced into the underground tank 12 through a line 36. This forces the prechilled Jet "A" fuel through a line 38 which passes through an inerting unit 312 and then into the heat exchanger 26, which is mounted on the truck 24, where the fuel is cooled even further. The inerting unit 312 injects an inerting agent 316 (shown in FIG. 1) into the Het "A" fuel passing through the flow line 38. The temperature of the refrigerated or chilled Jet "A" fuel may vary as it exits the heat exchanger 26. Preferably, the colder the fuel the better, provided the temperature of the fuel is maintained above the pour point of the fuel. Temperatures anywhere between 0 to −50° F. may be reached, with between −15 to −50° F. being preferred. In the particular example described, the Jet "A" fuel may be cooled to approximately −40° F., which is above the pour point of the fuel. The inerted, cooled Jet "A" fuel is passed from the heat exchanger 26, through a fuel hose 40 and to the fuel tank 42 of the aircraft 22. The inert, chilled Jet "A" fuel is then supplied to the engines 44 of the aircraft 22 as would normal temperature fuel. Increases in volume of the fuel due to warming usually are more than compensated for by the volume consumed during flight. The temperature of the fuel may rise only a few degrees per hour, but this is dependent upon ambient conditions. Because the cold-weather Jet "B" fuel is used as the coolant, leaks in either the heat exchanger 20 or the heat exchanger 26 do not present a major concern, as would exist if a non-jet-fuel coolant were used. Although the system of FIG. 1 utilizes a second refrigerated fuel as the coolant, liquid nitrogen may also be used to quickly reduce the temperature of elevated or ambient temperature, inert fuels to sub-zero temperatures.

Figure 7:
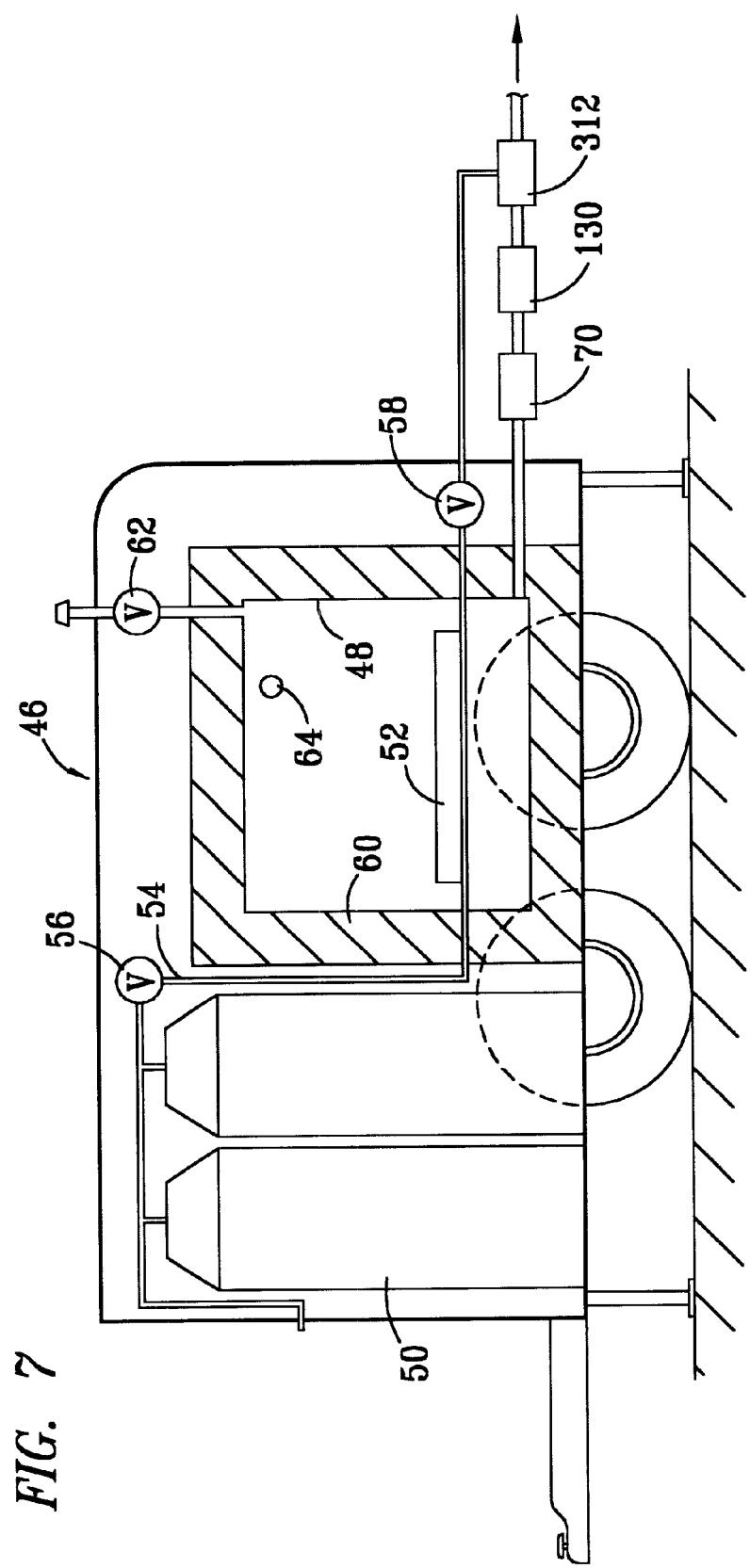
FIG. 7 is a mobile refrigeration unit used in cooling fuel.

FIG. 7 depicts a device 46 in which liquid nitrogen is used for cooling fuel, and then is injected into the fuel to inert the fuel. The device 46 is shown as a trailer, so that it may be moved to desired locations if needed, however, it may be stationary as well. The device 46 may be provided with a pump or compressor (not shown), such as the compressor 34 of FIG. 6, to deliver fuel to an aluminum fuel tank 48 of the device 46. Liquid nitrogen is stored in Dewar tanks or vessels 50. The number and size of tanks will depend on the quantity of fuel being cooled. It has been found that 5,000 gallons of liquid nitrogen is adequate to reduce the temperature of 16,000 gallons of jet fuel by 100° F. A cryogenic heat exchanger 52 is disposed within a tank 48. Materials of the heat exchanger 52 are preferably non-ferrous materials, such as aluminum or brass. Stainless steel may also be used, however, ferrous materials tend to become brittle at extremely low temperatures. The heat exchanger 52 is connected to the nitrogen tanks 50 by an insulated liquid nitrogen supply line 54. A control valve 56 regulates introduction of nitrogen into the heat exchanger 52. Temperature probes and suitable controls (not shown) should be provided to ensure that the fuel is cooled and maintained at the desired temperature. A control valve 58 controls the flow of nitrogen into the mixing unit 318, after the nitrogen is expanded from a liquid to a gas to cool the fuel in the heat exchanger 52. The control valve is preferably operated as an expansion valve, to assure that the nitrogen is expanded to a gaseous state prior to being injected into the fuel passing through the flow line 66. The mixing unit 318 is preferably operated by the controller 320 (shown in FIG. 1) to inject the nitrogen into the fuel. Insulation 60, such as EPS foam, or a vacuum chamber, surrounds the fuel tank 48. A pressure relief valve 62 is provided with the tank 48 to vent fuel vapors to the atmosphere if necessary. An inlet 64 of the tank 48 allows ambient temperature fuel to be cooled to flow into the tank 48. Cold, nitrogenated fuel is withdrawn from the tank 48 through an outlet 66. A suitable delivery hose, a pump, a nozzle, a filter and metering equipment (not shown) may be provided with the tank 48 and coupled to the outlet 66. Other inert gases which are expansible from a liquid to a gaseous phase may be used for the inerting agent and to coll the fuel in other embodiments.

To use the device 46 of FIG. 7, ambient or warm temperature fuel is pumped into the tank 48 through the inlet 64. As the tank 48 is filled, the control valve 56 is opened to allow liquid nitrogen to flow from the tanks 50 to the heat exchanger 52 so that the fuel within the tank 48 is cooled. Nitrogen gas exits the heat exchanger 52 and then passes through the valve 58, in which any liquid nitrogen is expanded to a gaseous state and then passes through the mixing unit 318. The mixing unit 318 injects the gaseous nitrogen into the fuel passing through the outlet 66 to inert the fuel. As the fuel is cooled to the desired temperature, it is withdrawn from the tank 48 through the outlet 66, is injected with the nitrogen, and then is supplied to the fuel storage tank(s) of the vehicle or aircraft being fueled. It should be apparent that the fuel cooled by means of the device 46 may be cooled as a batch or may be fed continuously through the tank 48 so that a continuous stream of cooled fuel is supplied. Appropriate controls should be provided to ensure that the fuel exiting the tank 48 is maintained at the desired temperature.

Figure 8:
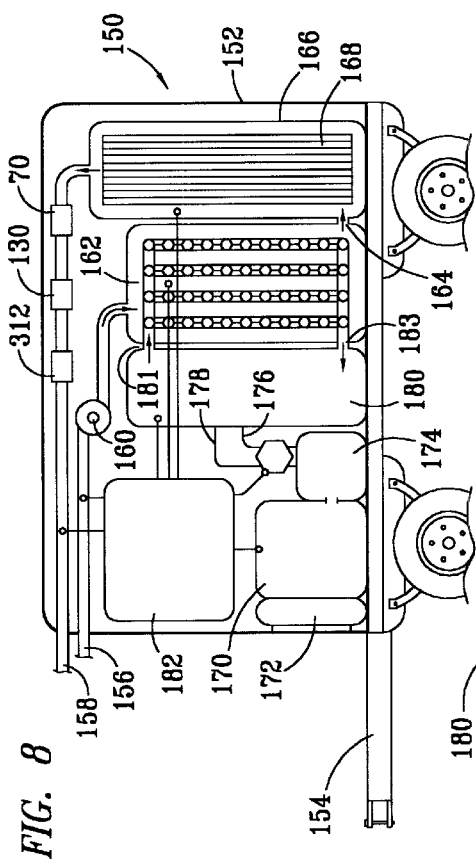
FIG. 8 is a side elevational view of a portable refrigeration unit.
Figure 9:
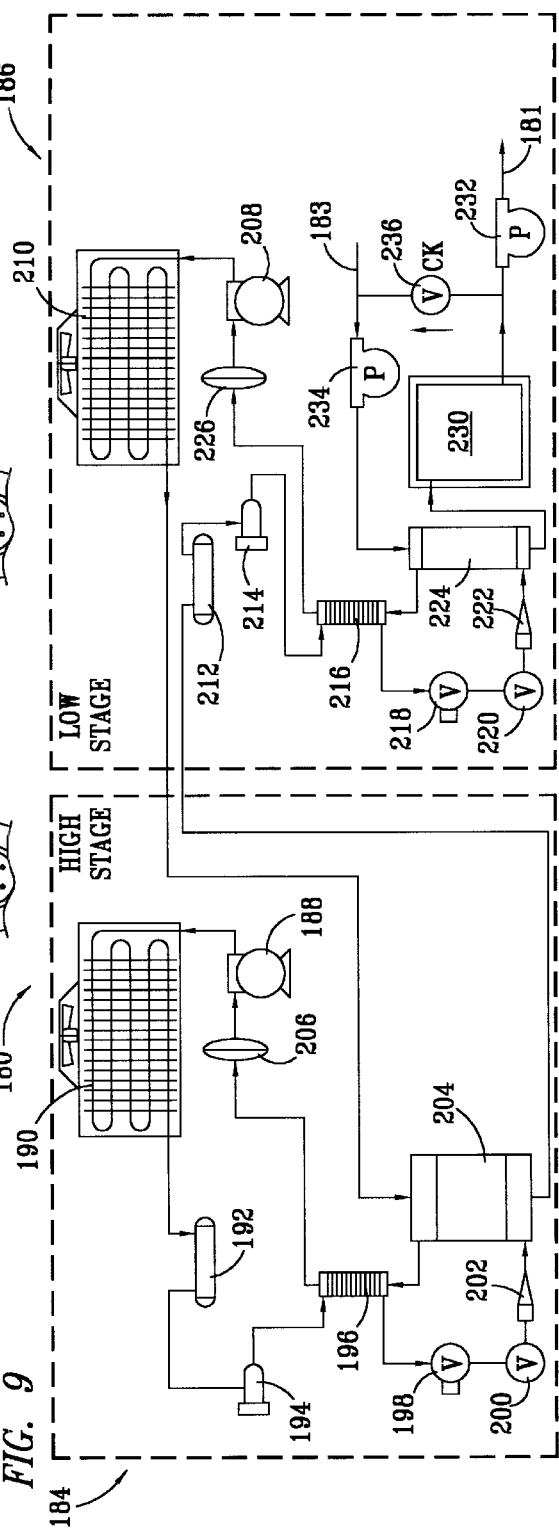
FIG. 9 is a schematic diagram depicting a two-stage, low temperature chiller for providing jet fuel at low temperatures.

FIG. 8 is a side elevational view of a portable refrigeration and inerting unit ("PRIU") 150, which is a self contained fuel cooling and inerting unit. As depicted in FIG. 9, the PRIU 150 is trailer mounted. The PRIU 150 includes an explosion-proof cabinet 152 which is mounted to a trailer chassis 154. A fuel inlet 156 and a fuel outlet 158 are provided for passing fuel into and then from the PRIU 150. A fuel pump 160 is provided on the inlet fuel line 156. In some embodiments, the pump on the conventional fuel supply may provide sufficient pressure for flowing the fuel through the PRIU 150, such that the fuel pump 160 is only required in high flow conditions. The PRIU 150 further includes a heat exchanger 162 to which the fuel inlet 156 is connected. A flow path 164 connects the heat exchanger 162 in fluid communication with a water separation unit 166, which preferably is of the type having a coalescing filter 168. In other embodiments, other types of water separators may provide the water separator unit 166 of the PRIU 150, such as gravity type separators and various other types. In the preferred water separation unit 166, an absorption media 168 is provided which swells upon contact with moisture. When excessive moisture is absorbed by the absorption media 168, the PRIU 150 will require servicing. The fuel than passes into an inerting unit 312, which is preferably trailer mounted with the PRIU 150, for injecting the inerting agent 316 (shown in FIG. 1) into the flue passing to the fuel outlet 150. A power unit 170 provides the motive power for operation of the PRIU 150. The power unit 170 is a preferably a self-contained industrial diesel engine, which is configured to operate on the jet fuel being chilled by the PRIU 150. A radiator 172 is provided for cooling a liquid coolant used within the power unit 170. The radiator 172 is of the type used with conventional diesel engines. The power unit 170 drives a hydraulic drive pump 174. The hydraulic drive pump 174 is connected by hydraulic lines 176 and 178 to a low temperature chiller 180. The hydraulic pump 174 moves hydraulic fluid through the hydraulic lines 176 and 178 to drive compressors included in the low temperature chiller 180. An electronic control unit 182 monitors and controls operation of the various components of the PRIU 150. The electronic control unit 182 preferably includes a programmable controller, such as a microprocessor of the type used conventional personal computers and process controllers. The chiller 180 is connected to heat exchanger 162 by flow paths 181 and 183.

FIG. 9 is a schematic diagram of a two-stage chiller which is preferably utilized to provide the low temperature chiller 180 of the PRIU 150. The chiller 180 includes a high stage 184 and a low stage 186. The high stage 184 includes a compressor 188, which is preferably a screw type compressor that is hydraulically driven by the power unit 170 and the hydraulic drive pump 174. The compressor 188 causes the refrigerant to flow within the high stage section 184. The refrigerant passes from the compressor 188 to a condenser 190. The condenser 190 is air cooled, with a fan forcing the air to pass through the condenser 190. Ambient air provides a heat sink. The refrigerant passes through the condenser 190, through a receiver 192 and then through a filter/dryer unit 194. The refrigerant then passes from the filter/dryer unit 194 and through a first side of a liquid/suction interchanger 196. A solenoid valve 198 controls the flow of the refrigerant through the high stage 184. The refrigerant will then flow through the thermal expansion valve 200, through a distributor 202 and to an evaporator/condenser 204. The high stage refrigerant passes through the evaporator side of the evaporator/condenser 204, through a second side of the liquid/suction interchanger 196 and to a suction filter 206 on the inlet of the hydraulically powered compressor 188. The low stage 186 includes a hydraulically powered compressor 208, which is preferably a screw type compressor. The discharge of the compressor 206 is connected to an air cooled desuperheater 210, which is preferably cooled by fan forced air, such that ambient air provides a heat sink. Refrigerant then passes from the air cooled desuperheater 210 and through the low stage side of the evaporator/condenser 204 for transferring heat from the low stage refrigerant to the high stage refrigerant. The low stage refrigerant then passes through a receiver 212 and a filter dryer 214, and through a liquid/suction interchanger 216. A solenoid valve 218 is located after the liquid/suction interchanger 216 for controlling the flow of the refrigerant through the low stage 186. The low stage refrigerant then passes through a thermal expansion valve 220, a distributor 222 and a first side of an evaporator 224. The refrigerant passes from the evaporator 224, back through the liquid/suction interchanger 216 and then through a suction filter 226. The low side refrigerant then passes from the suction filter 226 and into the inlet of the compressor 208. A cooling fluid preferably passes through a second side of the evaporator 224. In other embodiments, the fuel may be directly cooled in the evaporator 224. Heat is transferred from the cooling fluid to the second stage refrigerant passing through the second stage 186. The cooling fluid, after passing through the evaporator 224, passes into a storage reservoir 230. A pump 232 is connected to the outlet of the storage reservoir 230. A bypass check valve 236 is connected to the line extending between the storage reservoir 230 and the pump 232. The check valve 236 will pass the cooling fluid to the bypass pump 234 in response to the bypass pump 234 being actuated to circulate the cooling fluid therethrough. The check valve 236 will pass the cooling fluid from the discharge of the storage reservoir 230, to the inlet of the bypass pump 234, and then to the cooling fluid inlet of the evaporator 224.

The PRIU 150 may be towed behind a conventional vehicle, or the refrigeration components thereof may be mounted to the chassis of a conventional refueling truck, as shown in FIG. 11. When the PRIU 150 is used in conjunction with a conventional fuel truck, the PRIU 150 will take advantage of the truck's onboard pumps, filters and water separation unit, which are typically mounted on such fuel trucks. After lowering the temperature and injecting an inerting agent, the fuel is super-filtered and super-water separated, then brought back to the truck where it is again filtered and separated and immediately prior to delivery of the aircraft.

Preferably, the low temperature chiller 180 of the PRIU 150 is operated using a conventional refrigerant rather than liquid nitrogen. The refrigerant is preferably HFC-507/R-23. Other types of refrigerant may be utilized such as SYLTHERM XLT liquid or d-LIMONENE. The PRIU 150 is sized for processing from 100 to 800 gallons per minute of liquid jet fuel, grades A and B. The physical size of the PRIU 150 is 18 feet long, by 8 feet wide, by 8 feet high. The weight is approximately 10,500 pounds. The power unit 170 is rated to 160 horsepower. The estimated BTU load of the PRIU 150 at 100 gallons per minute is estimated to be 1,924,230 BTUs per hour. The PRIU 150 is microprocessor controlled, and includes the initiation of a fail safe shut down should operating condition sensors indicate a malfunction or unsafe circumstances. The PRIU 150 will automatically shut down at a fuel pressure of 65 PSI. The fail safe automatic shut down temperature is –55° F. for the refrigerants, and –33° F. for the process liquids. Kerosene of a specific heat of 0.50 and specific gravity of 0.777 is utilized for the cooling fluid, which transfers heat between the low temperature chiller 180 and the heat exchanger 162. The refrigerant transfer fluid outlet temperature is preferably –40° F. Design pressures are 50 PSI, at design refrigerant flow rates of 200 gallons per minute. The normal operating ambient temperature range of the unit is from 32° F. to 105° F.

It should be noted, that in other embodiments, the PRIU 150 may be used to cool and inert the fuel within an onboard fuel tank of a vehicle, such as the tank 70 of FIG. 3. Two options are possible. One option is to circulate fuel from the tank 70 through the PRIU 150, connecting the inlet 156 and the outlet 158 of the PRIU 150 to the tank 70. A second option is to pass an intermediate cooling fluid between the PRIU 150 and the heat exchanger 74 of the tank 70. Refrigerant from the chiller 180 may also be circulated directly through the cryogenic heat exchanger 74, or an intermediate cooling fluid may be circulated from the outlet 158, through heat exchanger 74, and then back through the inlet 156 to the PRIU 150. In other embodiments, a refrigeration unit similar to the PRIU 150 described above may be skid mounted or permanently mounted at an aircraft facility.

Figure 10:
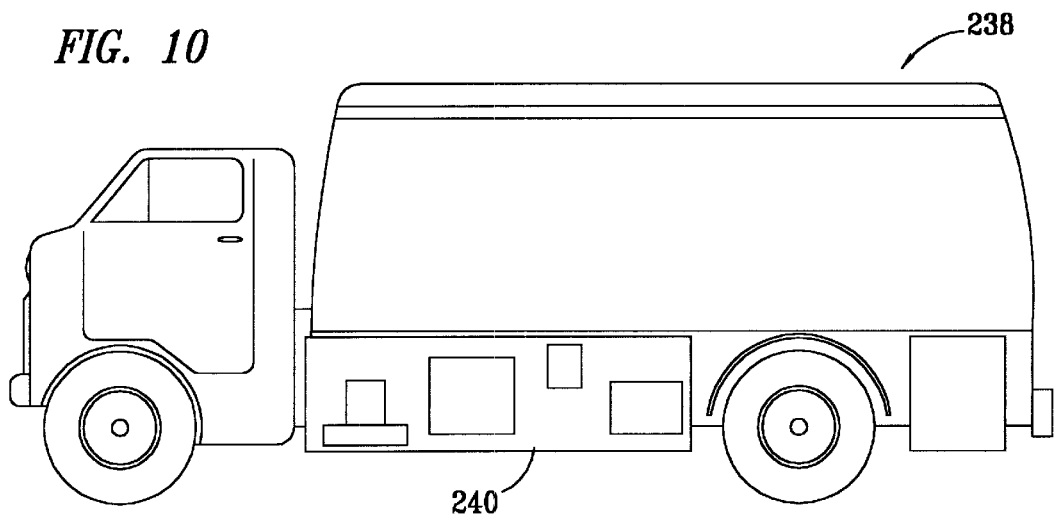
FIG. 10 is a side elevational view of an aircraft refueller truck which includes a portable refrigeration unit.

FIG. 10 is a side elevational view of an aircraft refueller truck 238 which includes a portable refrigeration and inerting unit 240, which is mounted to the chassis of the truck 238. The refrigeration unit 240 includes the processing components of the PRIU 150 for cooling and inerting fuel, except that they are mounted to the chassis of the truck 238 rather than a trailer.

Expendable refrigerants other than liquid nitrogen may be used for cooling fuel. Expendable refrigerants may be provided by liquid nitrogen, carbon dioxide, argon or liquid helium. Such expendable refrigerants, which are also inert, can be utilized in the above described embodiments in place of liquid nitrogen.

The refrigerated fuel has a much smaller density so that more fuel may be stored within fuel tanks. This is particularly advantageous for large commercial jet aircraft, which require great amounts of fuel. There is also particular application with vehicles having reciprocating-type engines. Refrigerated fuel ultimately increases engine efficiencies, performance and reduces exhaust emissions. Modern automotive technology senses the presence of refrigerated fuel and systematically converts its extra-energy resulting from its increased density into improved engine performance, such as increased fuel mileage and/or reduced exhaust emissions through more lean fuel/air mixtures. Aircraft reciprocating engine technology does not use modern computer electronic monitoring devices to monitor levels of unburned fuel residue in exhausts. Refrigerated fuel offers aircraft significant advantage. Aircraft benefit through more-lean or more-rich fuel/air mixtures as accomplished by the pilot in flight through manual adjustment. Extra energy becomes available through a more-dense refrigerated fuel. In a refrigerated state, the fuel itself contains additional energy per measurement and therefore offers more available engine power at take-off and in cruise flight through more rich-mixtures or the engine can be manually leaned-back, providing a more-lean and efficient fuel burn, increased economy, extended range and reduced emissions.

The problems created by the existence of ice in low temperature jet fuel can be greatly lessened by lowering the temperature of fuel beneath the freezing point of water to both cause dissolved water to leave solution within the fuel and become free water, and then to freeze the free water within the fuel to form ice crystals. Then, a cyclonic centrifugal solids separator may be used as a pre-filter to trap up to 95% of the entrained ice before the fuel is filtered by the required stage one, two and three filters of conventional aircraft fuel filtration equipment. After passing through the cyclonic separator, the fuel will still be filtered by conventional means to assure quality. The cyclonic centrifugal solids separator will operate continuously, pre-screening the fuel flow for ice and prevent the automatic failsafe system shutdowns due to stopped up stage one filters. The cyclonic centrifugal solids separator will automatically separate, remove and collect frozen ice crystals in a special chamber that may easily serviced. Fuel which has been dried by such a method allows the operation of an aircraft at greater altitudes where lower temperatures are encountered and where thinner air allows improved performance efficiencies over that at lower altitudes.

Although the preferred embodiment has been described in detail, it should be understood that various changes, substitutions and alterations can be made therein without departing from the spirit and scope of the invention as defined by the appended claims.

What is claimed is:

1. A method for treating fuel, comprising the steps of:

providing a liquid fuel;

cooling the fuel to reduced temperatures, such that dissolved water is removed from solution with the fuel and becomes free water, and at least a portion of the free water within the fuel freezes;

separating the frozen free water from the fuel; and loading the fuel into a fuel storage tank.

2. The method of claim 1, wherein the step of separating the frozen free water from the fuel comprises the steps of:

passing a mixture of the frozen free water and the fuel into a chamber;

swirling the mixture within the chamber;

removing at least a portion of the frozen free water from within the chamber from an outer peripheral portion of the chamber; and removing at least a portion of the fuel from within the chamber from an inwardly disposed portion of the chamber, such that the removed portion of the fuel is separated from the portion of the frozen free water.

3. The method of claim 2, wherein the step of swirling the mixture within the chamber comprises the step of moving the mixture in a downwardly spiraling path, which narrows in a downward direction.

4. The method of claim 2, wherein an interior surface of the chamber is heated to a temperature such that the frozen free water will not obstruct flow through the chamber.

5. The method of claim 1, further comprising:

directly injecting a gaseous inerting agent into the fuel; and wherein the gaseous inerting agent separates from within the fuel in the storage tank and moves into the ullage of the storage tank, substantially rending the ullage non-combustible.

6. The method of claim 5, wherein said inerting agent is nitrogen.

7. The method of claim 5, further comprising the step of venting the storage tank to atmosphere.

8. The method of claim 1, further comprising the steps of: storing the fuel in a storage tank while the fuel is at the reduced temperatures, the reduced temperatures reducing a storage volume of the fuel thereby allowing more fuel to be held in the storage tank.

9. The method of claim 8, wherein the fuel is cooled to temperatures not substantially less than 32° F.

10. The method of claim 8, wherein the fuel is cooled to temperatures which are not substantially less than 40° F. below ambient temperatures.

11. The method of claim 8, wherein the fuel is cooled to temperatures between about 0° F. and −50° F.

* * * * *